(12) United States Patent
Gray

(10) Patent No.: US 7,067,077 B2
(45) Date of Patent: Jun. 27, 2006

(54) PROCESS FOR MANUFACTURING FRICTION MATERIAL SUITABLE FOR USE AS BRAKE LINING

(75) Inventor: Paul E. Gray, North East, MD (US)

(73) Assignee: Honeywell International Inc., Morris Township, NJ (US)

(*) Notice: Subject to any disclaimer, the term of this patent is extended or adjusted under 35 U.S.C. 154(b) by 0 days.

(21) Appl. No.: 10/833,632

(22) Filed: Apr. 27, 2004

(65) Prior Publication Data
US 2004/0202896 A1    Oct. 14, 2004

Related U.S. Application Data

(62) Division of application No. 10/101,035, filed on Mar. 19, 2002, now Pat. No. 6,749,937.

(51) Int. Cl.
  *C04B 35/78* (2006.01)
  *C04B 35/83* (2006.01)
  *F16D 69/02* (2006.01)

(52) U.S. Cl. ............. 264/29.2; 264/640; 264/682; 156/89.25; 156/89.26

(58) Field of Classification Search ............ 156/89.26; 264/29.1, 29.2, 640, 641, 642, 643, 682; 428/408
See application file for complete search history.

(56) References Cited

U.S. PATENT DOCUMENTS

| | | | | |
|---|---|---|---|---|
| 3,201,330 A | * | 8/1965 | Stuart ...................... | 264/29.7 |
| 3,291,872 A | * | 12/1966 | Brown et al. ............... | 106/284 |
| 3,689,299 A | * | 9/1972 | Brown et al. ............... | 106/284 |
| 3,702,771 A | * | 11/1972 | Brown et al. ............... | 501/94 |
| 3,932,568 A | | 1/1976 | Watts et al. | |
| 4,019,912 A | | 4/1977 | Augustin | |
| 4,115,528 A | * | 9/1978 | Christner et al. ......... | 423/447.4 |
| 4,339,021 A | | 7/1982 | Kosuda | |
| 4,457,967 A | | 7/1984 | Chareire et al. | |
| 4,722,817 A | * | 2/1988 | Nakano et al. ............ | 264/29.5 |

(Continued)

FOREIGN PATENT DOCUMENTS

| | | |
|---|---|---|
| DE | 1 131 882 | 6/1962 |
| WO | WO 99/41069 A1 | 8/1999 |
| WO | WO 02/26659 A1 | 4/2002 |

*Primary Examiner*—Melvin Mayes
(74) *Attorney, Agent, or Firm*—Birch, Stewart, Kolasch & Birch, LLP

(57) ABSTRACT

Carbon-silicon carbide brake preforms are manufactured by carbonizing a blend of carbon (e.g., polyacrylonitrile) fibers and thermosetting pitch resin, optionally along with a lubricant such as graphite,.to provide an intermediate product having open porosity and subsequently filling the pores of the intermediate product with silicon by a melt infiltration process. Molded articles that consist principally of carbon, that have relatively high strength and resistance to decomposition by frictional heat, and that are suitable for melt infiltration with silicon, are produced by, e.g.: coating randomly oriented polyacrylonitrile-derived carbon fibers, optionally mixed with finely divided carbon powder, with a thermosetting blend of (a) pitch and (b) an organic medium, at an elevated temperature to form a viscous molding compound; molding the compound at a low pressure and elevated temperature so that a solid compact is obtained; stripping a molded article made of said compound from the mold; optionally heating the molded article at gradually increasing temperatures to insure complete condensation within the article; and carbonizing the condensed molded article in an inert atmosphere at gradually increasing temperatures to produce a molded C/C intermediate article suitable for melt-infiltration with silicon. The preforms may be configured in the form of a disc brake rotor or a disc brake pad.

7 Claims, 3 Drawing Sheets

U.S. PATENT DOCUMENTS

| | | | |
|---|---|---|---|
| 5,007,508 A | 4/1991 | Lacombe | |
| 5,398,784 A | 3/1995 | Haneda et al. | |
| 5,439,080 A | 8/1995 | Haneda et al. | |
| 5,501,729 A * | 3/1996 | Lewis et al. | 106/274 |
| 5,562,966 A * | 10/1996 | Clarke et al. | 428/113 |
| 5,566,792 A | 10/1996 | Yamamoto et al. | |
| 5,578,255 A | 11/1996 | Okuyama et al. | |
| 5,587,034 A * | 12/1996 | Ma | 156/166 |
| 5,725,077 A | 3/1998 | Taylor et al. | |
| 5,753,018 A | 5/1998 | Lamport et al. | |
| 5,962,135 A | 10/1999 | Walker et al. | |
| 6,024,898 A * | 2/2000 | Steibel et al. | 264/29.1 |
| 6,056,912 A * | 5/2000 | Sohda et al. | 264/478 |
| 6,079,525 A * | 6/2000 | Dietrich et al. | 188/251 A |
| 6,110,268 A | 8/2000 | Gross et al. | |
| 6,129,868 A | 10/2000 | Penkov et al. | |
| 6,231,791 B1 * | 5/2001 | Heine et al. | 264/29.5 |
| 6,248,269 B1 | 6/2001 | Dietrich et al. | |
| 6,255,234 B1 | 7/2001 | Erdemir et al. | |
| 6,261,981 B1 | 7/2001 | Dietrich et al. | |
| 6,302,246 B1 | 10/2001 | Naumann et al. | |
| 6,517,756 B1 * | 2/2003 | Rebstock | 264/108 |
| 6,749,937 B1 * | 6/2004 | Gray | 428/408 |
| 6,773,528 B1 * | 8/2004 | Tani | 156/89.26 |
| 6,838,162 B1 * | 1/2005 | Gruber et al. | 428/293.4 |
| 2002/0109250 A1 * | 8/2002 | Kim et al. | 264/29.7 |

* cited by examiner

PROCESS FOR MANUFACTURING FRICTION MATERIAL SUITABLE FOR USE AS BRAKE LINING

This application is a divisional of U.S. application Ser. No. 10/101,035 filed Mar. 19, 2002 the entire contents of which are herein incorporated by reference. Application Ser. No. 10/101,035 has issued as U.S. Pat. No. 6,749,937 B2.

FIELD OF INVENTION

This invention relates to carbon-silicon carbide brake preforms manufactured by carbonizing a blend of carbon (e.g., polyacrylonitrile) fibers and thermosetting pitch resin to provide an intermediate product having open porosity and subsequently filling the pores of the intermediate product with silicon by a melt infiltration process.

BACKGROUND OF INVENTION

Brake discs for aircraft or automobiles require materials having high heat resistance and long wear. Asbestos has been used in these applications, due to its heat resistance properties. Asbestos-based friction components have limited applicability under severe use conditions because the polymeric resins used to bind the asbestos fibers together decompose at elevated temperatures. Carbon-carbon brake components have become increasingly more common, but their high cost and poor cold friction properties precludes their use in automotive applications.

Among the types of substrates used to make carbon-carbon parts are discontinuous carbon fiber moldings, non-woven airlaid carbon substrates, woven carbon fiber substrates, and braided carbon fiber substrates. The substrates are typically stacked on top of each other to a desired thickness, and then the stacked substrates are needle-punched together to join or consolidate the substrates to each other by intermingling carbon fibers between the layers of substrates in the preform so produced. The preform is then typically batch carbonized to char the fiber of the substrate and thereby increase the carbon content of the preform. The carbonized preform may then be die cut to a desired shape. Subsequently, carbon atoms may be deposited on the carbon fibers of the preforms by means of a chemical vapor deposition (CVD) process, e.g. with methane. The preform may then be heat-treated to reorient the carbon atoms which optimizes thermomechanical properties, machined if necessary, and treated with an anti-oxidant to form the finished carbon-carbon part.

U.S. Pat. No. 6,248,269, like the present application, relates to C/SiC brake preforms. This patent teaches manufacturing brake linings of fiber-reinforced C/SiC materials by producing carbon fiber bodies having specific pore and/or capillary volumes, infiltrating the carbon fiber bodies by carbon and/or carbon precursors, and pyrolyzing the infiltrated carbon fiber body to produce porous C/C pre-bodies which are then infiltrated by liquid silicon, at which point "the carbon is ceramized to silicon carbide at least in the area of the pores and capillaries close to the surface". Column 3, lines 11–24. As will be apparent from the description herein below, the present invention does not produce a carbon fiber body having a specific pore or capillary volume by subsequent reinfiltration of a carbon body with additional resin.

Carbon-silicon carbide (C/SiC) brake preforms are conventionally made by melt infiltrating (MI) silicon into the pores of a carbonized carbon fiber/graphite preform. A process for doing so is depicted in FIG. 1. Alternatively, as described for instance in U.S. Pat. No. 5,962,135, a colloidal ceramic solution comprising silicon dioxide may be infiltrated into a carbon/carbon preform and therein converted to a refractory material of silicon carbide.

When polyacrylonitrile (PAN) fibers are used in a melt infiltration process, they are conventionally adhered into a preform with phenolic-based resins. However, this approach requires that the fibers be protected with a chemical vapor deposition (CVD) pyrolytic carbon layer, so that the fibers will not be damaged by the molten silicon during melt infiltration.

U.S. Pat. No. 6,129,868 is concerned with the manufacture of high density carbon-carbon preforms for friction materials. The patent discloses thermomechanical pressing method using any carbon fiber (including PAN) and industrial coal tar or petroleum pitches having a melting point of 176–662° F. (80–350° C.). Column 1, lines 42–54. In this context, it teaches that an "... industrialized petroleum pitch exhibited better wetting ability compared to high-temperature coal-tar pitches". Column 2, lines 23–31.

U.S. Pat. No. 5,753,018 relates to improved binder resin mixtures for vehicular brake linings. In the paragraph bridging columns 1–2, this patent teaches that "Alternatives to phenolics have been made available for years, but their use has been limited to specialized applications. ... Some of the evaluated resin binders such as coal tar and petroleum pitches are quite brittle, despite having a low cost and a high char yield."

U.S. Pat. No. 3,932,568 relates to molded carbon base or graphite base articles for use in braking systems. This patent teaches, relative to the character of the binder used for coating and adhering together the carbon particles in such articles, that "The pitches and tars usually used in making graphite articles heretofore are unsuitable. Resins of the phenolic type must be used." Column 4, lines 31 and following.

SUMMARY OF INVENTION

In accordance with the present invention, carbon-silicon carbide brake preforms are manufactured by carbonizing a blend of carbon (e.g., polyacrylonitrile) fibers and thermosetting pitch resin, optionally along with a filler such as graphite, to provide an intermediate product having open porosity and subsequently filling the pores of the intermediate product with silicon by a melt infiltration process.

Molded articles that consist principally of carbon, that have relatively high strength and resistance to decomposition by frictional heat, and that are suitable for melt infiltration with silicon, are produced by, e.g.: coating randomly oriented polyacrylonitrile fibers, optionally mixed with finely divided carbon powder, with a thermosetting blend of (a) pitch and (b) an organic medium, at an elevated temperature to form a viscous molding compound; molding the compound at a low pressure and elevated temperature so that a solid compact is obtained; stripping a molded article made of said compound from the mold; optionally heating the molded article at gradually increasing temperatures to insure complete condensation within the article; and carbonizing the condensed molded article in an inert atmosphere at gradually increasing temperatures to produce a molded C/C intermediate article suitable for melt-injection with silicon. The molded preform intermediates may be configured in the form of a disc brake rotor or a disc brake pad.

It has been discovered that pitch-based thermosetting resin systems can form extremely strong bonds with the surfaces of carbon fibers such as PAN fibers, and that these bonds are maintained through the carbonization step of the preform manufacturing process. One example of these pitch-based thermosetting resin systems is a 50:50 weight percent mixture of coal tar pitch and 2-furaldehyde. These resin mixtures are catalyzed using an acidic species such as p-toluenesulfonic acid. Those skilled in the art will readily appreciate that other thermosetting mixtures of pitch and organic solvents (e.g., furfuryl alcohol) and other acidic catalysts, to initiate a thermosetting crosslinking reaction, will provide similar results.

As a result of the strong bond between the thermosetting pitch resins and the carbon fibers, the fiber bundles in the preform retain their integrity and are protected from attack by molten silicon during the melt infiltration process. This approach permits the omission of the costly CVD step required in conventional PAN preform manufacture or other intermediate processing operations such as reimpregnation with additional resins followed by resin curing and carbonization.

An added benefit of the pitch-based resin approach of this invention is that the resin mixture has a low viscosity and cures at temperatures of as low as 266° F. (130° C.). These low temperatures greatly extend the life of mold release coatings used in dies to manufacture molded parts. The low resin viscosity permits complex parts to be molded from mixtures of PAN fibers and pitch resin without resorting to the high pressures needed for conventional phenolic-based chopped fiber molding compounds. Also, this invention enables resin transfer molding of dry carbon fibers at low pressures and temperatures.

BRIEF DESCRIPTION OF THE DRAWINGS

The present invention will be more fully understood by reference to the detailed description given hereinbelow and the accompanying drawings. The drawings are not to scale and are given by way of illustration only. They do not in any way limit the present invention.

DETAILED DESCRIPTION OF INVENTION

Silicon Melt Infiltrated (MI) Products

The present invention provides friction preforms, which may be described as compressed and charred mixtures of 30–70 parts by weight of C/SiC friction materials and 30–70 parts by weight of carbonized organic fibers, the organic fibers being protected in accordance with this invention by pitch-based resin char. An alternative embodiment of this invention is a friction article that is a compressed and charred mixture of 30–70 parts by weight of a C/SiC friction material, up to 30 parts by weight of a friction-modifying constituent, and 20–45 parts by weight of carbonized organic fibers protected by pitch-based resin char. The carbonized organic fibers may be carbonized cellulose, rayon, and/or polyacrylonitrile fibers. The optional friction-modifying constituent may be a graphite powder.

The C/SiC preforms of this invention have, for instance, a porous matrix of carbonized polyacrylonitrile fibers, optionally graphite powder, and pitch-based resin char. The pores of the matrix are filled and reacted with metallic silicon. In accordance with this invention, the pitch-resin char forms a continuous layer around carbon fibers resulting from carbonization of the polyacrylontrile fibers. This pitch-resin char layer is impermeable to molten silicon.

Figure 3:
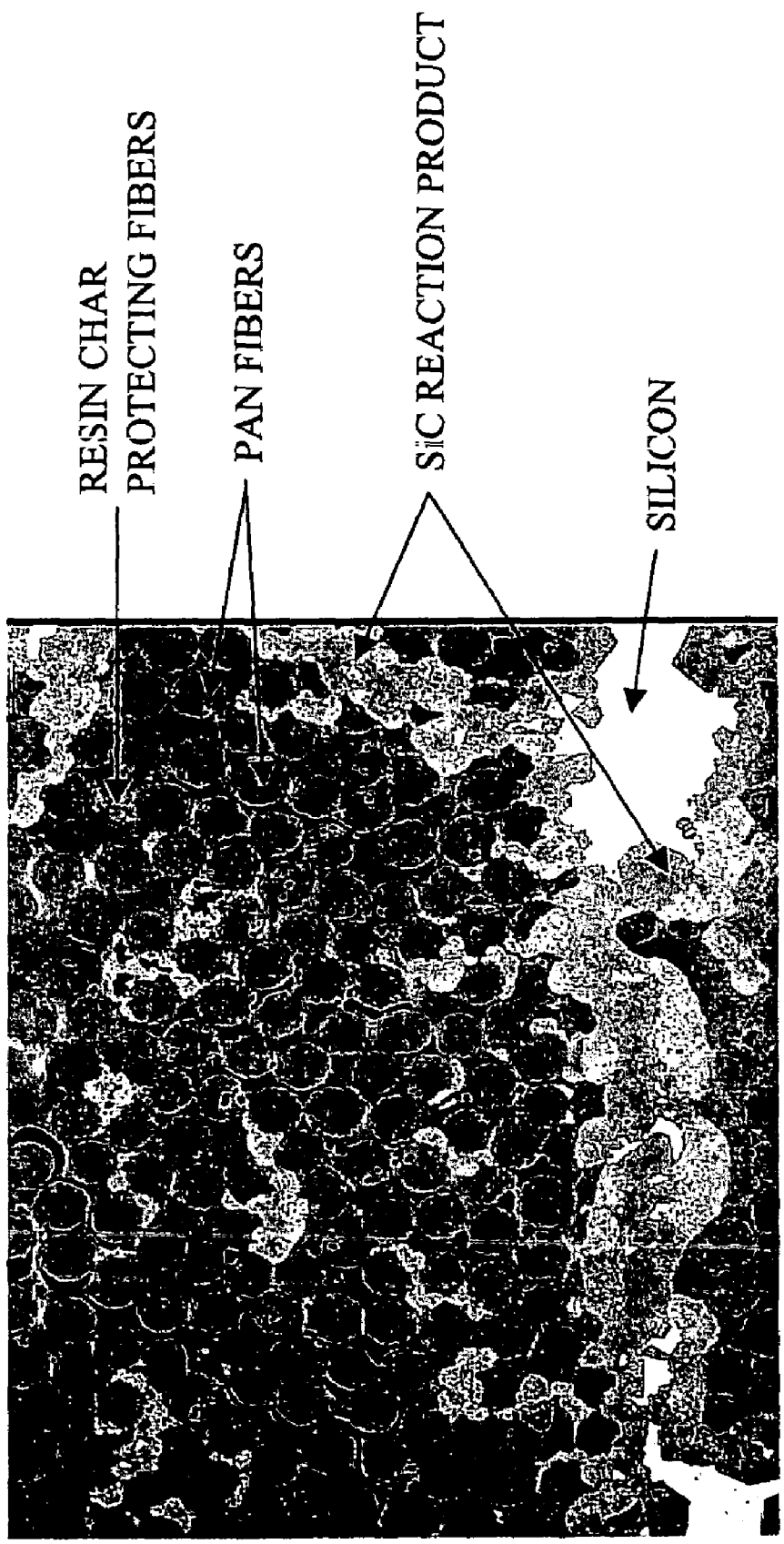
FIG. 3 shows the microstructure of a PAN-pitch resin preform which has been melt infiltrated with silicon.

FIG. 3 shows the microstructure of a PAN-pitch resin preform which has been melt infiltrated with silicon. FIG. 3 identifies the relative positions of the carbonized PAN fibers, the resin char protecting the fibers, and silicon, and points out the position also of SiC reaction product in the preform.

Methods of Making C/C Precursor Products

Another aspect of the present invention is a process for producing molded articles that consist principally of carbon, that have relatively high strength and resistance to decomposition by frictional heat, and that are suitable for melt infiltration with silicon. This process includes coating randomly oriented polyacrylonitrile-derived or other carbon fibers with a thermosetting blend of (a) pitch and (b) an organic medium, at an elevated temperature, e.g. about 150° F. (66° C.), to form a viscous molding compound. The fibers may optionally be mixed with graphite or another suitable lubricant. The thermosetting blend of pitch and an organic medium may be an acid-catalyzed blend of pitch and furfural.

The viscous molding compound is molded at a low pressure and elevated temperature to provide a solid compact. The molded article made of the compound is then stripped from the mold. For instance, the coated fiber compound may be molded at a pressure of about 10–500 psi and a temperature of about 150–250° F. (66–121° C.) for a time sufficient to solidify the compound and produce a free-standing article upon ejection from the mold. The molded article may then be optionally heated at gradually increasing temperatures to insure complete condensation within the article. For example, the molded article may be heated at gradually increasing temperatures over a period of at least 24 hours to about 450° F. (232° C.) to insure complete condensation of the resin in the molded article.

Finally, the condensed molded article may be heated in an inert atmosphere at gradually increasing temperatures to produce a molded C/C intermediate article suitable for melt-infiltration with silicon. Thus, for example, the product may be carbonized in an inert atmosphere at gradually increasing temperatures to about 1200–2300° F. (648–1260° C.) over a period of at least 24 hours to produce the C/C intermediate article.

Manufacturing MI Friction Products

Figure 1:
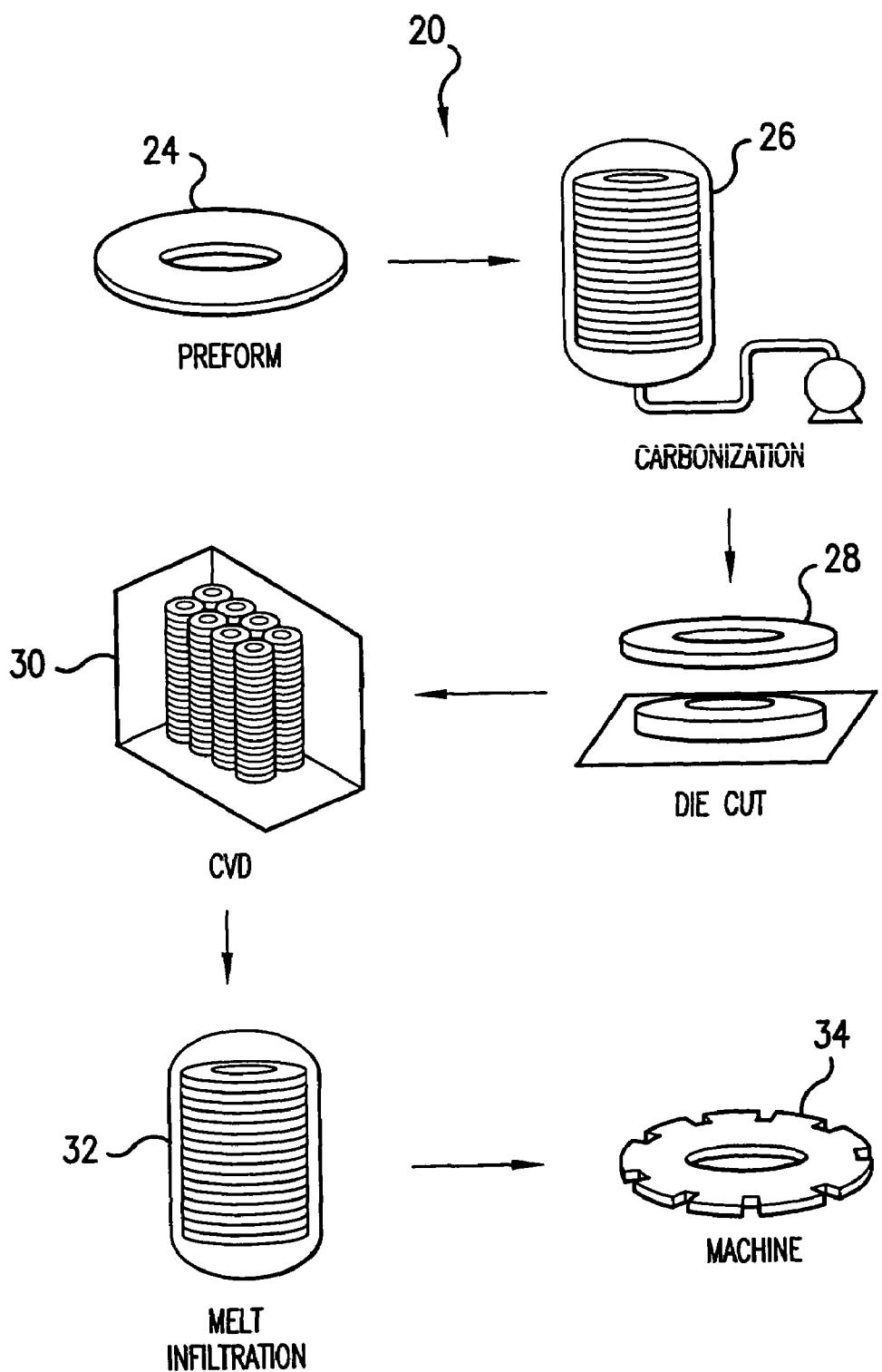
FIG. 1 depicts a process for making C/SiC brake preforms by melt infiltrating (MI) silicon into the pores of a carbonized carbon fiber/graphite preform.
Figure 2:
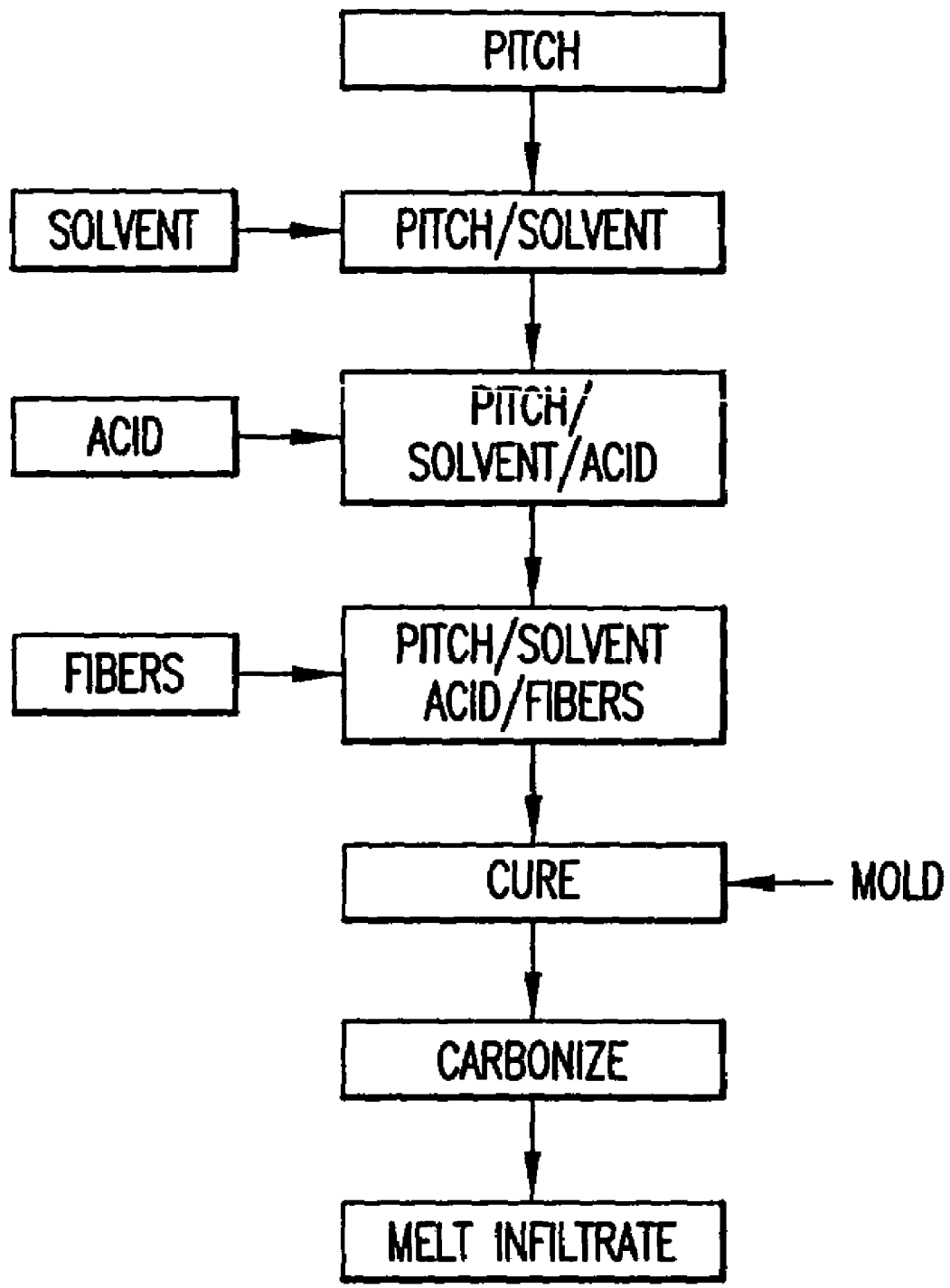
FIG. 2 is a flowchart showing a melt infiltration process in accordance with the present invention.

This invention also provides processes for manufacturing brake linings made of a fiber-reinforced ceramic C/SiC material. The process of this invention includes the steps of: producing a mixture of carbon fibers and pitch resin mixture, for instance a blend of coal tar pitch and 2-furaldehyde; pressing the mixture to form a green compact; pyrolyzing the green compact to form a porous C/C body in which the carbon fibers are at least partially sheathed by pitch; and infiltrating the C/C body with liquid silicon so that a portion of the carbon randomly distributed throughout the C/C body becomes silicon carbide. This process is depicted in FIG. 2.

Manufactured products of this invention include C/SiC preforms that are manufactured as described herein and are configured in the form of a disc brake rotor or a disc brake pad. Thus this invention also contemplates disc braking systems containing C/SiC rotors and/or C/SiC pads manufactured as described herein.

Thus one embodiment of this invention is a sintered brake rotor for cooperating with a brake pad, the rotor comprising:

carbon fibers; silicon carbide particles bonded at least partially by melt infiltration-induced reaction to the carbon of the carbon fibers; optional lubricants—e.g., graphite or a metal calcogenides such as molybdenum sulfide; and pyrolyzed polymers derived from pitch as binding agents.

EXAMPLES

Manufacturing

Example 1

15V coal tar pitch and 2-furaldehyde (furfural) were mixed in a 50:50 weight-percent ratio. The mixture was heated to 70° C. to dissolve the pitch in the furfural, forming a pitch resin mixture. The pitch resin mixture was allowed to cool to room temperature. Subsequently, a 656 gram fraction of the pitch resin mixture was warmed to 50° C. and 66 grams of toluenesulfonic acid catalyst was dissolved into it. Separately, 720 grams of polyacrylonitrile (PAN) fibers (Fortafil grade 143) were dry blended with 126 grams of graphite powder (Lonza KS-44) in a plastic bag. The warm acidified pitch resin mixture was added to the PAN/graphite mixture in the bag and the components were blended together. The entire mixture was then charged into an 8"×8"×0.75" square press mold having a cavity shaped to provide a preform.

The mold was pressurized to 70 psi (to stops) and then clamped together with steel draw bolts to maintain pressure. The pressurized mold was placed into an oven and heated to 302° F. (150° C.) for 8 hours to cure the resin.

After the curing procedure, the preform was placed into a nitrogen-purged retort (a carbonization furnace) and heated at a rate of 27° F. (15°C.)/hour to a temperature of 1382° F. (750° C.) to carbonize the PAN fibers and the pitch/furfural resin mixture. After carbonization, the preform was annealed under vacuum at 2912° F. (1600° C.) for 1 hour and then cooled.

The percentage open porosity was determined using Archimedes method (i.e., displacement). The open porosity percentage was then used to calculate how much silicon would be needed to fill the pores of the preform in the melt infiltration process. Finally, the preform was infiltrated with molten silicon at 2642° F. (1450° C.) in a vacuum furnace.

The microstructure of the finished preform revealed that there was minimal fiber attack during the melt infiltration step. Three-point flexure testing showed strain-to-failure values on the order of 0.5% on the tensile side of the beam.

Example 2

15V coal tar pitch and furfural were mixed in a 50:50 weight-percent ratio. The mixture was heated to 158° F. (70° C.) to dissolve the pitch in the furfural, forming a pitch resin mixture. The pitch resin mixture was allowed to cool to room temperature. Subsequently, a 400 gram fraction of the pitch resin mixture was warmed to 122° F. (50° C.) and 42 grams of toluene sulfonic acid catalyst was dissolved into it. The warm acidified pitch resin mixture was added to 500 grams of PAN fibers (Fortafil grade 143) in the bag and the components were blended together. The entire mixture was then charged into a 200 mm cylindrical die.

The die was placed in a heated platen press and heated to 302° F. (150° C.) for a period of 2 hours, during which time the pressure within the cavity of the die was maintained at 70 psi. The die and the disc preform which formed therein as a result of this procedure were then allowed to cool under 70 psi pressure.

After this curing procedure, the preform was placed into a nitrogen-purged retort (a carbonization furnace) and heated at a rate of 27° F. (15° C.)/hour to a temperature of 1382° F. (750° C.) to carbonize the PAN fibers and the pitch/furfural resin mixture. After carbonization, the preform was annealed -under vacuum at 2912° F. (1600° C.) for 1 hour and then cooled.

The percentage open porosity was determined using Archimedes method (i.e., displacement). The open porosity percentage was then used to calculate how much silicon would be needed to fill the pores of the preform in the melt infiltration process. Finally, the preform was infiltrated with molten silicon at 2642° F. (1450° C.) in a vacuum furnace.

The microstructure of the finished preform revealed that there was minimal fiber attack during the melt infiltration step. Three-point flexure testing showed strain-to-failure values on the order of 0.5% on the tensile side of the beam.

EXAMPLES

Operating

Pad/rotor friction couples were tested on a Greening Test Labs Friction Assessment Screening Test (FAST) apparatus. The FAST apparatus rotates a 7" brake rotor at a sliding speed of 23 ft/sec. A 0.5"×0.5" pad is pressed into the rotor to maintain constant predetermined torque. The apparatus displays the data as lining normal pressure/friction coefficient as a function of time. The test is run for 90 minutes. Measurements are taken of the pad to determine wear rate, which is expressed in horsepower per (cubic inch-hour).

Three rotors made from preforms of the present invention were tested with three different pads. Two of the pads consisted of C/SiC where PAN fibers were also used, but the preform employed phenolic resin and CVD pyrocarbon to protect the fibers. One test was run with the fibers parallel to the disc surface and the other test was run with the fibers oriented normal to the disc surface. The third pad was made of the same preform material of the present invention, as were the rotors. For comparison purposes, Jurid 539 and Texstar T7400 pad materials were tested on generic cast iron rotors. The results were as follows (embodiments of the present invention are identified by bold type):

| Rotors | Pads | Hr*0.001 | Coeff. | |
|---|---|---|---|---|
| Cast iron | Jurid 539 | 3.9 | 0.35–0.55 | Incr. Friction w/time |
| Cast iron | Texstar T7400 | 4.2 | 0.27–0.7 | Incr. Friction w/time |
| C/SiC (pitch) | C/SiC (pitch) | 2 | 0.5–0.6 | Stable coeff. over test |
| C/SiC (pitch) | C/SiC (CVD) fibers parallel | 5 | 0.55–0.65 | Stable coeff. over test |
| C/SiC (pitch) | C/SiC (CVD) fibers perp. | 1.4 | 0.5–0.55 | Stable coeff. over test |

Extending Mold Release Coating Life

Another aspect of this invention is a method for extending the life of mold release coatings in the manufacture of brake discs or pads. This method includes the steps of: (a) providing a mold die in the shape of a brake disc or pad; (b) coating the interior of the die with a mold release coating; (c) filling the die with a blend of polyacrylonitrile-derived fibers and pitch tar solution; (d) curing the blend at a temperature below 302° F. (150° C.) ; and (e) removing the cured blend from the die. In accordance with this aspect of the invention, steps (c) through (e) can be repeated 50% more times than is possible with an otherwise comparable process using a different blend in step (c) and using a curing temperature higher than 302° F. (150° C.).

What is claimed is:

1. A process for manufacturing a brake lining made of a fiber-reinforced ceramic C/SiC material, comprising:
   producing a mixture of organic carbon fibers and pitch resin mixture;
   pressing the mixture to form a green compact;
   pyrolyzing the green compact to form a porous C/C body in which the organic carbon fibers are at least partially sheathed by pitch; and
   infiltrating the C/C body with liquid silicon so that a portion of the carbon randomly distributed throughout the C/C body becomes silicon carbide,
   thereby forming a friction material suitable for use as a brake lining, said material comprising a compressed and charred mixture of 30–70 parts by weight of a C/SiC friction material and 30–70 parts by weight of carbonized organic carbon fibers protected by pitch-based resin char.

2. The process of claim 1, wherein the pitch resin mixture comprises a blend of coal tar pitch and furfuryl alcohol.

3. A process for manufacturing a fiber-reinforced ceramic C/SiC brake lining material, said process comprising sequentially:
   (a) forming a pitch resin mixture;
   (b) treating said pitch resin mixture with an acidic catalyst to form an acidified pitch resin binder mixture;
   (c) adding organic carbon fibers and a friction-modifying constituent to said acidified pitch resin binder mixture to form a mixture of organic carbon fibers and pitch resin mixture;
   (d) pressing the fiber-containing pitch resin mixture to form a green compact;
   (e) pyrolyzing the green compact to form a porous C/C body having organic carbon fibers that are at least partially sheathed by pitch; and
   (f) infiltrating the C/C body with liquid silicon so that a portion of the carbon that is randomly distributed throughout the C/C body becomes silicon carbide;
   thereby forming a friction material suitable for use as a brake lining, said material comprising a compressed and charred mixture of 30–70 parts by weight of a C/SiC friction material, up to 30 parts by weight of a friction-modifying constituent, and 20–45 parts by weight of carbonized organic carbon fibers protected by pitch-based resin char.

4. The process of claim 3, wherein said friction-modifying constituent is a graphite powder.

5. The process of claim 3, wherein, after pyrolyzing, the organic carbon fibers are carbonized organic carbon fibers selected from the group consisting of carbonized cellulose, rayon, and polyacrylontrile fibers.

6. The process of claim 3, wherein the pitch resin mixture comprises a blend of coal tar pitch and furfuryl alcohol.

7. The process of claim 3, wherein the acidic catalyst comprises toluene sulfonic acid.

* * * * *